(No Model.)  2 Sheets—Sheet 1.
G. S. ADAMS.
TOOL FOR TURRETS OF TURRET LATHES.
No. 352,795. Patented Nov. 16, 1886.
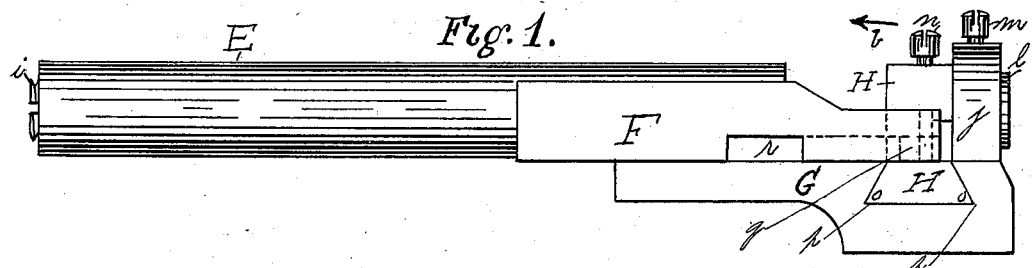
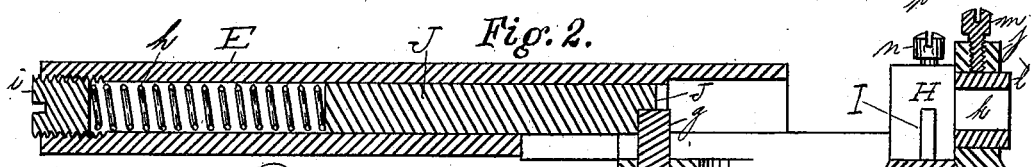
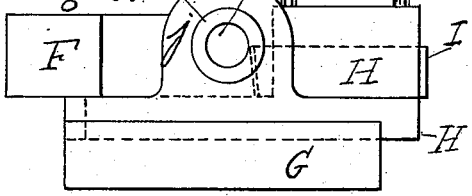
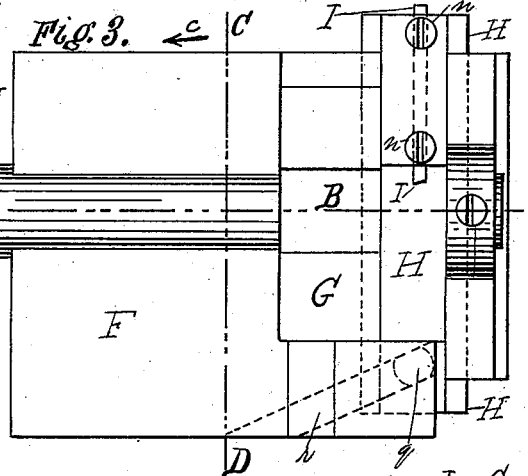
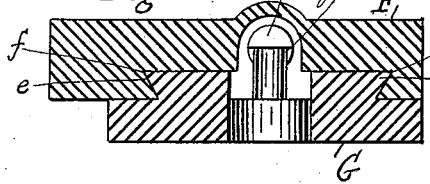
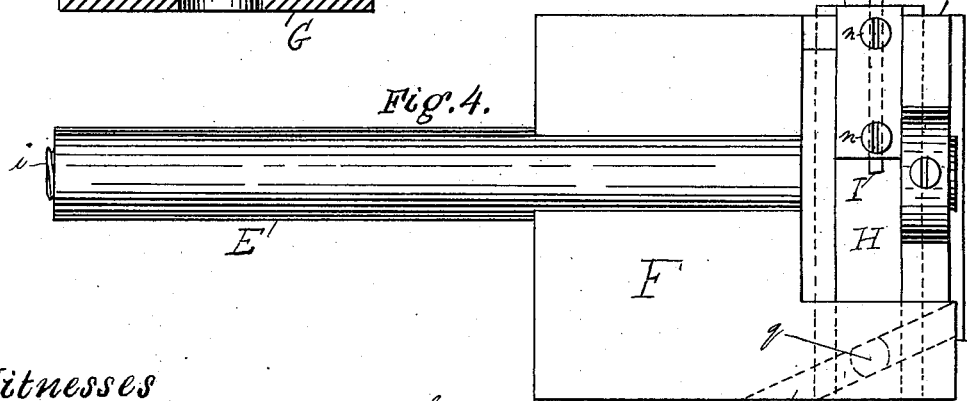
Witnesses
Frederick William Smith
George F. Dewey
Inventor George S. Adams,
per John C. Dewey,
Attorney.
N. PETERS, Photo-Lithographer, Washington, D. C.

(No Model.) 2 Sheets—Sheet 2.
G. S. ADAMS.
TOOL FOR TURRETS OF TURRET LATHES.
No. 352,795. Patented Nov. 16, 1886.
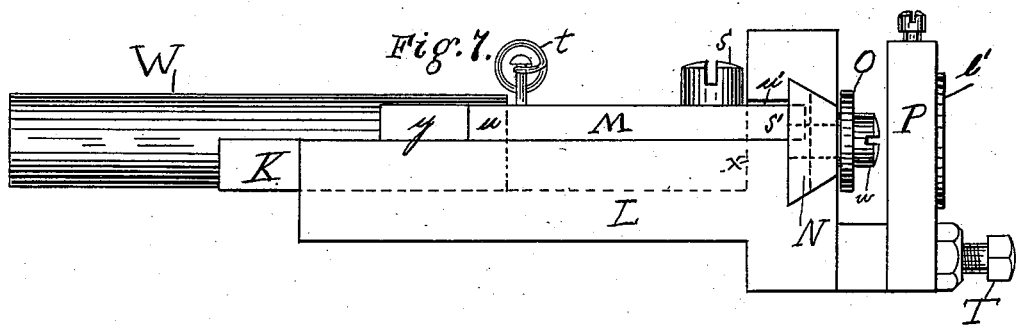
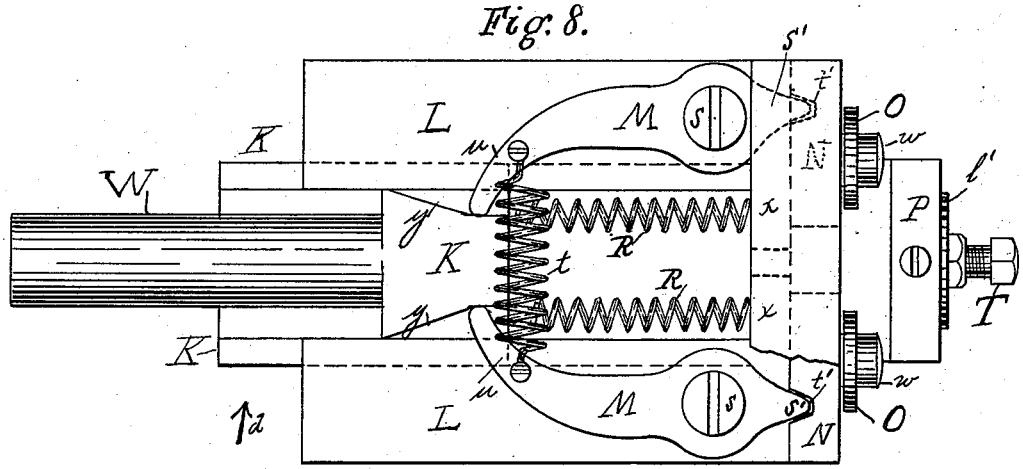
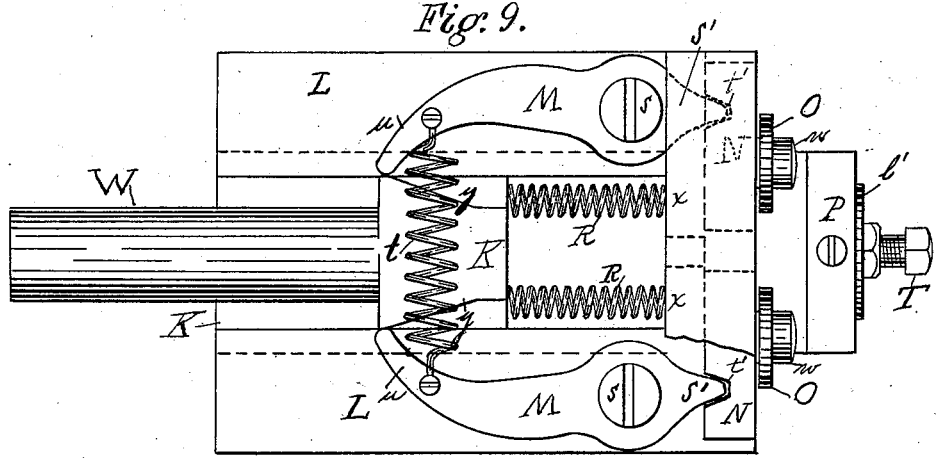
Witnesses
Frederick William Smith
George T. Dewey
Inventor George S. Adams,
per John C. Dewey
Attorney.

UNITED STATES PATENT OFFICE.

GEORGE S. ADAMS, OF WORCESTER, MASSACHUSETTS.

TOOL FOR TURRETS OF TURRET-LATHES.

SPECIFICATION forming part of Letters Patent No. 352,795, dated November 16, 1886.

Application filed March 26, 1886. Serial No. 196,710. (No model.)

*To all whom it may concern:*

Be it known that I, GEORGE S. ADAMS, a citizen of the United States, residing at Worcester, in the county of Worcester and State of Massachusetts, have invented certain new and useful Improvements in Tools for Turrets of Turret-Lathes; and I do hereby declare that the following is a full, clear, and exact description thereof, which, in connection with the drawings forming a part of this specification, will enable others skilled in the art to which my invention belongs to make and use the same.

My invention relates to tools to be used in the turret of a turret-lathe of any usual and well-known construction for manufacturing machine screws, nuts, &c.; and my invention consists in certain novel features of construction of the tools, as will hereinafter be fully described, and the nature thereof indicated by the claims.

As the manner of construction and mode of operation of turret-lathes are old and well known, and as the same form no part of my present invention, which relates only to the tools used in turrets of turret-lathes of any usual and well-known construction, it is not necessary to describe or show a turret-lathe or the turret for holding my improved tools, which are supported in the turret and held in place therein and operated thereby in the same manner as the old form of tools now in general use.

Heretofore the tools used in a turret of a turret-lathe have been so constructed as to act upon the material supported in the revolving spindle or mandrel of the lathe in a direction parallel to its axis of revolution; but my improved tool for turrets of turret-lathes is so constructed and operated that it acts upon the material to be operated upon in a direction at right angles to its axis of revolution. I am thus enabled to use, in a turret of a turret-lathe, tools which can cut off the material, or mill or bead the heads of screws and nuts, &c., which has heretofore been done by means of separate tools stationary with the bed of the lathe, and not carried in the turret of the lathe. I am able by means of my improved tools, used in the turret of a turret-lathe, to do a greater range of work on a lathe than has heretofore been done at one operation.

Referring to the drawings, Figure 1 is a side elevation of my improved tool. Fig. 2 is a central longitudinal section on line A B, Fig. 3, looking in the direction of arrow *a*, same figure. Fig. 3 is a top or plan view of my improved tool, the cutter being shown drawn out preparatory to acting upon the material to be operated upon. Fig. 4 is a top or plan view showing the cutter pushed in, having acted upon the material. Fig. 5 is an end view of my improved tool, looking in the direction of arrow *b*, Fig. 1. Fig. 6 is a cross-section on line C D, Fig. 3, looking in the direction of arrow *c*, same figure. Fig. 7 is a side elevation of a modification of my invention, looking in the direction of arrow *d*, Fig. 8. Fig. 8 is a top or plan view of the modification shown in Fig. 7, representing two milling or beading tools for operating simultaneously, one on each side of the material to be operated upon, the tools being shown drawn apart preparatory to acting on the material; and Fig. 9 is a top or plan view of the modification shown in Fig. 8, showing the milling or beading tools drawn together, after having acted upon the material to mill or bead the same.

In the accompanying drawings, the part marked E is the shank for entering the turret of a turret-lathe, and is held therein by any usual means to prevent it from turning. At the outer end of said shank E, and in this instance made integral with it, is a beveled guide piece or way, F, for supporting and guiding the movable carriage G, upon which the guide-piece F slides back and forth, V-shaped tongues *e*, fitting into V-shaped grooves *f*, cut in the under side of the guide-piece F. (See Fig. 6.) A plunger, J, connected with the sliding carriage G, in this instance by means of a stud, *g*, extends into the shank E, made hollow to receive it, and a coiled spring, *h*, pressing against the end of said plunger J and against a screw, *i*, secured in the end of shank E, pushes or forces the sliding carriage G out and away from the inner end of the guide-piece F, as shown in Fig. 3. Any equivalent means for forcing the carriage G away from the guide-piece F may be used instead of the spring *h*. The outer end of the carriage G is made with a projection, *j*, extending up therefrom, having a hole, *k*, therein on a line with the axis of the revolving spindle for holding the material to be operated upon, and in this instance containing a removable bushing or other guide, *l*, held in place by a screw, *m*, for supporting the rotating rod while being acted upon by the cutters or other tools.

Upon the carriage G is supported a slide, H, moving at right angles to the axis of revolution of the rod or other material to be operated upon, and carrying an adjustable cutter, I, supported at one end thereof. Said slide H has a slot therein to receive the cutter I, which may be adjusted in or out and held in place by means of screws *n*. The slide H, carrying the cutter I, is connected with the carriage G, in this instance by having V-shaped tongues *o*, extending into V-shaped grooves *p* in the upper side of said carriage G, (see Fig. 1,) and is caused to slide in and out upon the carriage G, so as to have the cutter or other tool supported and carried on said slide H operate upon the rod at right angles to the axis of revolution thereof by means of a pin or stud, *g*, extending up from said slide and fitting into a groove or slot, *r*, cut in the under side of the guide-piece F, as fully shown in Figs. 1, 3, and 4 of the drawings.

The moving forward of the guide-piece F upon the carriage G, which remains stationary, causes the pin *g* to slide along in the slot *r* and draw in the slide H, as shown in Fig. 4, thus causing the cutter I to act upon the revolving rod, extending through the bushing *l* of the part *j* of the carriage G, in a direction at right angles to the axis of revolution of said rod.

I have shown in Figs. 1, 2, 3, and 4 of the drawings my improved tool for turrets of turret-lathes provided with a cutter or cutting-tool, I, for cutting off the rod; but a tool for cutting a taper on the rod, or a tool for milling or beading, or a tool used for any other operation which is usually done by a tool stationary with the bed of the lathe, may be substituted for the cutter I shown in the drawings.

It will be readily understood by those skilled in the art that instead of a single tool, I, to act upon the material upon one side thereof, two tools, either cutting-off, milling, or other kind, may be used to act upon the material upon opposite sides thereof as it revolves between them.

The advantage of employing two tools or a double tool, instead of one tool, I, as above described, is that the work can be done much more expeditiously, the material being operated upon upon opposite sides simultaneously and by a single operation or forward movement of the turret.

In order to adapt the device shown in Figs. 1, 2, 3, 4, 5, and 6 of the drawings, and hereinbefore described, to carry and operate two tools, instead of the one tool I shown, it is necessary to vary slightly the manner of construction of the device to carry out my invention, which, as before stated, consists, essentially, in so constructing and operating tools for turrets of turret-lathes that they will act upon the material to be operated upon in a direction at right angles to its axis of revolution, and not in a direction parallel to the axis of its revolution, as has heretofore been done. Many different ways of changing the device shown in the first six figures of the drawings, to adapt the same to carry and operate two tools, instead of one, as shown, will occur to those skilled in the art, which will vary only in mechanical detail, and will be substantial equivalents of each other.

I have shown in Figs. 7, 8, and 9 one way of constructing and adapting the device shown in the first six figures of the drawings, so as to carry and operate two tools, instead of the single tool I.

Instead of the cutting-tool I, I have shown two milling-tools—small revolving disks with serrated edges—adapted to mill the material; but it will be readily understood that the manner of construction of the device for holding the same and the mode of operation thereof are the same as would be the case if two cutting-tools, similar to the tool I, were substituted for the two milling-tools shown.

I will now briefly describe the device shown in Figs. 7, 8, and 9, which I have only illustrated sufficiently to enable those skilled in the art to understand how the device shown in the first six figures of the drawings and provided with a single tool may be altered and adapted to carry two tools, which may be either beading, milling, or cutting-off tools, as desired, and which act upon the material upon opposite sides thereof and in a direction at right angles to the axis of revolution thereof in the same manner as the single tool I above described.

The part marked W is the shank, corresponding to the shank E in the previous figures of the drawings. At the outer end of the shank W, and in this instance made integral with it, is a carriage or slide, K, adapted to slide in and out on the beveled way or guide-piece L, said parts K and L being connected together by V-shaped tongues and grooves, in the same manner as the beveled way or guide-piece F and carriage G, before described. The beveled way or guide-piece L has two levers, M, pivoted upon its upper surface, one on each side, by screws *s*. The outer ends, *u*, of said levers M are connected together by a spiral spring, *t*, which tends to draw the levers toward each other at their outer ends, *u*, and away from each other at their inner ends, *s'*. The inner ends, *s'*, project through slots *u'* cut in the outer edges of the way L, and extend into slots *t'* cut into the slides N, which support the tools O and move in and out on the way or guide-piece L, said guide-piece being cut out to receive said slides N, and provided with V-shaped grooves, into which the V-shaped tongues on the slides N project, as shown in Fig. 7.

The disks O, provided with fine teeth or serrated edges, represent in this instance milling or beading tools, and they are supported on studs $w$, extending into the slides N, so that said disks O may rotate upon said studs $w$ in the process of milling or beading the material.

Upon the front edge of the way L the part P projects up, having a hole with an adjustable bushing, $l'$, therein, through which the rod to be operated upon extends, in the same manner as previously described in connection with the hole $k$ and bushing $l$ of carriage G. (Shown in the previous drawings.) An adjustable screw, T, extends out from the lower front edge of the guide-piece L, for the purpose of regulating the forward movement of the tool, the end of said screw coming in contact with a stationary piece secured upon the bed of the lathe, for the purpose hereinafter described. The use of said adjusting-screw T may be dispensed with, if preferred.

Between the end of the carriage K and projecting shoulders $x$ of the guide-piece L small spiral springs R are inserted, which tend to push the carriage K out from the guide-piece L, as shown in Fig. 8.

Upon the upper side of the carriage K are formed two projecting tapering shoulders, $y$, diverging from each other, against which the ends $u$ of levers M press, drawn together by spring $t$, which at the same time cause the ends $s'$ and the slides N, with the tools O supported thereon, to be drawn away from each other. In lieu of the spring $t$ any equivalent means for drawing the ends $u$ of the levers M toward each other may be used, and any equivalent means for pushing the slide K out from guide-piece L may be used in lieu of the springs R.

The beveled way or guide-piece L remaining stationary and the carriage or slide K being moved along thereon, the tapering shoulders $y$ force the ends $u$ of the levers M apart, and at the same time the slides N, with the tools O supported upon their outer faces, toward each other, to act upon the rod or material revolving between them in a direction at right angles to the axis of revolution thereof, as shown in Fig. 9.

The operation of my improved tool for turrets of turret-lathes will be readily understood from the above description, in connection with the drawings, by those skilled in the art to which my invention belongs. The shank of the tool is first inserted in the hole in the turret of a turret-lathe made to receive it, and secured therein by any usual and well-known means to prevent it from turning therein. A stationary stop or upright is secured upon the bed of the lathe, under and near the end of the revolving spindle or mandrel, against which, as the turret advances, the lathe having been put into operation, the front lower edge of the carriage G strikes, holding said carriage stationary. The turret continuing to advance causes the guide-piece F formed upon the end of the shank E to advance, and at the same time the slide H, carrying the cutter I, to be drawn in toward the revolving rod, extending through the bushing $l$, and causes said cutter to act upon said rod in a direction at right angles to the axis of revolution thereof, and to cut off said rod or otherwise operate upon the same. When said operation is completed, the turret returns to its former position, and the spring H or its equivalent causes the carriage G to be pushed out to its former position and the cutter I to be drawn back, ready to be used again.

In the case of the modification of my invention, shown in Figs. 7, 8, and 9, the operation is substantially the same as that above described. The end of the adjustable screw T, or, in case said screw is not used, the lower front edge of the guide-piece L striking against a stop or stationary projection as the turret advances, remains stationary, while the carriage or slide K, continuing to advance with the turret, causes the levers M to operate and to push toward each other the slides N, which support the tools O, between which the revolving rod extends, causing them to act upon opposite sides thereof in a direction at right angles to the axis of revolution of said rod. As the turret returns to its first position the spring $t$ or its equivalent operates the levers M, causing the slides N and the tools O supported thereon to be drawn back into their original position, ready to be used again.

The value of my invention will be readily appreciated by those skilled in the art, for by means of the same I am enabled to use in a turret of a turret-lathe tools for cutting off the rod, tapering the point, and milling or beading the heads of screws, nuts, &c., and all kinds of work where it is necessary that the operating-tool shall act upon the rod or other material in a direction at right angles to the axis of revolution of the same, and for which work it has been necessary heretofore to employ separate tools not carried in the turret of the lathe, but stationary with respect to the bed of the lathe; and by means of my invention I am enabled to perform two or more operations with one tool carried in the turret of a turret-lathe at one time and by one forward movement of the turret, thus decreasing to a great extent the amount of labor and time usually required, and thereby lessening the cost of the product.

I do not limit myself to the special manner of construction and arrangement of the parts of my improved tool as shown and described herein, as any equivalents thereof may be made use of, and any equivalent mode of operation may be employed without departing from the principle of my invention, which consists, essentially, in so constructing a tool, or a device for supporting and operating the tool to be used in a turret of a turret-lathe, that the action of said tool upon the material to be operated upon will be in a direction at right angles to the axis of revolution of said material.

Having thus described my invention, what I claim as new, and desire to secure by Letters Patent, is—

1. In a tool for a turret of a turret-lathe, the combination, with the shank for entering the turret, provided at its outer end with a way or guide-piece, of a sliding carriage connected with said way, and a slide carrying a tool supported upon said carriage and having a motion in a direction at right angles to the motion of the sliding carriage, and means for operating said slide, substantially as set forth, and for the purpose stated.

2. In a tool to be used in a turret of a turret-lathe, the combination, with the shank E, provided with a beveled way or guide-piece, F, at its outer end, of a sliding carriage, G, connected with and movable upon said guide-piece F, and a slide, H, carrying a tool, I, and supported upon and having a motion in a direction at right angles to the motion of the sliding carriage G, and means for operating said slide H, all constructed and operated substantially as set forth.

3. The combination, with the shank E and a beveled way or guide-piece, F, connected therewith and having a slot, $r$, therein for the purpose stated, and provided with a spring, of a carriage, G, connected with and movable upon the guide-piece F, and slide H, and adjustable cutter I carried thereon, said slide having a stud, $g$, and being connected with and having a motion upon the carriage G in a direction at right angles to the motion of said carriage upon the guide-piece E, substantially as set forth.

GEORGE S. ADAMS.

Witnesses:
JOHN C. DEWEY.
FRED. W. SMITH.